US010124211B2

(12) United States Patent
Scholl et al.

(10) Patent No.: US 10,124,211 B2
(45) Date of Patent: Nov. 13, 2018

(54) DEVICE FOR CARRYING OUT MOVEMENTS BY SHIFTING THE CENTER OF GRAVITY AND/OR ACTUATING MUSCLES OF A HUMAN BODY

(71) Applicant: HYVE AG, Munich (DE)

(72) Inventors: Johannes Scholl, Munich (DE); Michael Schmidt-Gabriel, Wessling (DE)

(73) Assignee: Icaros GmbH, Planegg (DE)

( * ) Notice: Subject to any disclaimer, the term of this patent is extended or adjusted under 35 U.S.C. 154(b) by 0 days.

(21) Appl. No.: 15/527,348

(22) PCT Filed: Aug. 5, 2015

(86) PCT No.: PCT/EP2015/068078
§ 371 (c)(1),
(2) Date: May 17, 2017

(87) PCT Pub. No.: WO2016/078785
PCT Pub. Date: May 26, 2016

(65) Prior Publication Data
US 2017/0326412 A1 Nov. 16, 2017

(30) Foreign Application Priority Data
Nov. 17, 2014 (DE) .................. 10 2014 223 446

(51) Int. Cl.
*A63B 24/00* (2006.01)
*A63B 21/00* (2006.01)
(Continued)

(52) U.S. Cl.
CPC ...... *A63B 24/0087* (2013.01); *A63B 21/0058* (2013.01); *A63B 21/00181* (2013.01);
(Continued)

(58) Field of Classification Search
CPC .......... A63B 24/0087; A63B 21/00181; A63B 21/0058; A63B 21/068; A63B 21/4033;
(Continued)

(56) References Cited

U.S. PATENT DOCUMENTS

D344,993 S    3/1994 Larrata
5,441,255 A   8/1995 Verbick
(Continued)

FOREIGN PATENT DOCUMENTS

CN    1411879 A    4/2003
DE    2917089 A1   11/1980
(Continued)

OTHER PUBLICATIONS

Search Report dated Jan. 29, 2016 by European Patent Office in related application EP 15176361.2, partial machine translation provided.
(Continued)

*Primary Examiner* — Glenn Richman
(74) *Attorney, Agent, or Firm* — Hassan Abbas Shakir; Katten Muchin Rosenman LLP

(57) ABSTRACT

A device is used for carrying out movements by shifting the center of gravity and/or actuating muscles of a human body. A user lies on the device and shifts the center of gravity by moving his or her hip region in order to incline a movable part of the device including the user's own body in different directions. Furthermore, the user wears video goggles or the like during the process and can move in a virtual environment using the overall system, which includes the video goggles and the movement device and can interact with these. The movements caused by the user can be generated solely using gravity by shifting the center of gravity. Additionally, the movements of the device are influenced by motors or dampers arranged in or on the device.

25 Claims, 4 Drawing Sheets

(51) Int. Cl.
| | |
|---|---|
| *A63B 21/005* | (2006.01) |
| *A63B 21/068* | (2006.01) |
| *A63B 23/035* | (2006.01) |
| *A63B 69/10* | (2006.01) |
| *A63B 71/06* | (2006.01) |
| *G09B 9/08* | (2006.01) |
| *G09B 19/00* | (2006.01) |
| *A63F 13/24* | (2014.01) |
| *A63B 22/00* | (2006.01) |
| *G06F 3/01* | (2006.01) |

(52) U.S. Cl.
CPC ........ *A63B 21/068* (2013.01); *A63B 21/4033* (2015.10); *A63B 21/4034* (2015.10); *A63B 21/4035* (2015.10); *A63B 21/4045* (2015.10); *A63B 21/4047* (2015.10); *A63B 21/4049* (2015.10); *A63B 23/03575* (2013.01); *A63B 69/10* (2013.01); *A63B 71/0622* (2013.01); *A63F 13/24* (2014.09); *G09B 9/08* (2013.01); *G09B 19/0038* (2013.01); *A63B 2022/0092* (2013.01); *A63B 2024/0093* (2013.01); *A63B 2024/0096* (2013.01); *A63B 2071/0661* (2013.01); *A63B 2220/05* (2013.01); *A63B 2220/833* (2013.01); *G06F 3/012* (2013.01)

(58) Field of Classification Search
CPC ............ A63B 21/4034; A63B 21/4035; A63B 21/4045; A63B 21/4047; A63B 21/4049; A63B 23/03575; A63B 69/10; A63B 71/0622; A63B 2022/0092; A63B 2024/0093; A63B 2024/0096; A63B 2220/05; A63B 2220/833; A63B 2071/0661; G09B 9/08; G09B 19/0038
See application file for complete search history.

(56) References Cited

U.S. PATENT DOCUMENTS

| | | | |
|---|---|---|---|
| D362,700 S | 9/1995 | Breibart | |
| D376,397 S | 12/1996 | Prodan | |
| 5,830,158 A | 11/1998 | Zanakis | |
| 6,012,926 A | 1/2000 | Hodges et al. | |
| D474,516 S | 5/2003 | Kuo | |
| 6,743,158 B2 * | 6/2004 | Giannelli | A63B 21/068 482/101 |
| D499,456 S | 12/2004 | Hsu | |
| D519,583 S | 4/2006 | Chen | |
| D526,032 S | 8/2006 | Wu | |
| D528,615 S | 9/2006 | Black | |
| D556,274 S | 11/2007 | Morgan | |
| 7,338,415 B2 * | 3/2008 | Giannelli | A63B 21/155 482/95 |
| D567,312 S | 4/2008 | Tsai | |
| D606,599 S | 12/2009 | Murray | |
| D608,401 S | 1/2010 | Campanaro | |
| D612,000 S | 3/2010 | Campanaro | |
| D627,011 S | 11/2010 | Potok | |
| 7,878,957 B1 | 2/2011 | Chen | |
| 7,938,763 B2 | 5/2011 | Campanaro | |
| 8,033,971 B2 * | 10/2011 | Campanaro | A63B 21/068 482/142 |
| 8,052,583 B1 | 11/2011 | Tsai | |
| 8,113,996 B1 * | 2/2012 | Allen | A63B 21/0088 482/57 |
| D667,513 S | 9/2012 | Lee | |
| D671,997 S | 12/2012 | Lien | |
| D705,367 S | 5/2014 | Ho | |
| D740,377 S | 10/2015 | Halper, Jr. | |
| 9,183,756 B2 * | 11/2015 | Maher | A61B 5/11 |
| D745,615 S | 12/2015 | Ho | |
| D770,236 S | 11/2016 | Pattipati | |
| 2005/0143226 A1 * | 6/2005 | Heidecke | A63B 21/0053 482/62 |
| 2010/0022354 A1 | 1/2010 | Fisher | |
| 2011/0039669 A1 | 2/2011 | Stewart et al. | |
| 2011/0270135 A1 | 11/2011 | Dooley et al. | |
| 2015/0294505 A1 | 10/2015 | Atsmon | |

FOREIGN PATENT DOCUMENTS

| | | |
|---|---|---|
| DE | 29801687 U1 | 5/1998 |
| EP | 2682164 A3 | 8/2014 |
| FR | 2852526 A1 | 9/2004 |
| GB | 2510136 A | 7/2014 |
| JP | 2009131647 A1 | 6/2009 |
| KR | 101326944 B1 | 11/2013 |
| WO | 2003033920 A2 | 4/2003 |
| WO | 2005004082 A2 | 1/2005 |
| WO | 2010036275 A1 | 4/2010 |
| WO | 2010059066 A1 | 5/2010 |

OTHER PUBLICATIONS

Office Action dated Aug. 26, 2015 by the German Patent Office (DPMA) in related application DE 10 2014 223 8446.8, partial machine translation provided.
Office Action dated Nov. 18, 2016 by the European Patent Office in related application EP 15176361.2, partial machine translation provided.
International Search Report in application PCT/EP2015/068078 uploaded to WIPO Patentscope May 26, 2016, WIPO translation provided.
Written Opinion of the International Search Authority in application PCT/EP2015/068078 uploaded to WIPO Patentscope May 26, 2016, German text.
Written Opinion of the International Search Authority in application PCT/EP2015/068078 uploaded to WIPO Patentscope dated May 26, 2016, English translation.
Office Action issued in German patent application 10 2015 212 253.0 by the German Patent Office (DPMA) dated Feb. 5, 2018 in German, partial machine translation provided.
Website article "Icaros: Wir Haben Uns Auf Die Flugmaschine Gewagt [Video]" available at de.ubergizmo.com/2015/04/29/icaros-wir-haben-uns-auf-die-flugmaschine-gewagt-video.html, authored by Matthias Stemkopf, published Apr. 29, 2015, machine translation provided.
Video "Icaros—Der VR-Traum vom Fliegen mit Trainingseffekt ausprobiert" available at youtu.be/8AlrMi63e5l, upload date Apr. 29, 2015, uploaded/authored by Übergizmo DE, translation of screenshot text in German provided.
Website article "Virtual Reality Brillen: Der Große Vergleich", available at de.ubergizmo.com/2015/03/25/virtual-reality-brillen-der-grosse-vergleich.html, authored by Matthias Stemkopf, published Mar. 25, 2015, machine translation provided.
Moller et al. (NPL "Gymskill: A personal trainer for physical exercises.") Moller, Andreas, et al. "Gymskill: A personal trainer for physical exercises." Pervasive Computing and Communications (PerCom), 2012 IEEE International Conference on. IEEE, 2012; cited in n. U.S. Appl. No. 15/197,340.
Office Action issued in European Patent Application 15 744 095.9 by the European Patent Office dated Jun. 8, 2018 in German, partial machine translation provided.

* cited by examiner

DEVICE FOR CARRYING OUT MOVEMENTS BY SHIFTING THE CENTER OF GRAVITY AND/OR ACTUATING MUSCLES OF A HUMAN BODY

BACKGROUND OF THE INVENTION

1. Field of the Invention

The invention relates to a device for carrying out movements by shifting the center of gravity and/or actuating muscles of a human body.

2. Discussion of the Related Art

From sports equipment development, training devices for use in fitness studios such as treadmills, steppers or bicycle ergometers are known. A user sits or stands thereon and carries out predetermined movements. The aim is to burn calories, to achieve a training effect, and to generate fun for the user by physical exercise.

Furthermore, game consoles such as a Microsoft Wii® or a Sony PlayStation Move® are known, wherein the user performs physical movements that are detected by a sensor, which can influence or control game play on a TV screen.

Furthermore, 3D cinemas are known, in which films are shown using a three-dimensional effect, in order to be able to offer the audience a film experience which is as realistic as possible. The purpose of a 3D effect in movies is, on the one hand, to increase the joy of watching, and, on the other hand, to make the action on the screen look more realistic and to make the movie audience forget about being in a movie showing. It is desired for the audience to have the perception to be part of the action as much as possible.

Furthermore, simulators are known, in which, for example, a user controls a Formula 1 car or a racing motorcycle, wherein, instead of a real windshield, a system of computer monitors is provided to the user. Moreover, a realistic driving experience can be enhanced by the fact that the user sits in a realistically replicated vehicle cockpit and the controls differ only insignificantly from those of a real vehicle.

Furthermore, video goggles are known, which are positioned on the head of a user and fixed thereon. A virtual reality can be displayed visually on such video goggles, wherein, during the use of such a device, a user feels as if he could look around in this virtual reality and move freely within it. When the user rotates his head and thus also the video goggles, a stationary receiver system receives the common movement of the head and the goggles and transmits the direction and the speed of movement to a computing unit which calculates the video image displayed by means of the video goggles correspondingly, so that a user gets the impression to relay be able to move in the virtual space.

Furthermore, flight simulators for pilot training are known, which, on the one hand, replicate an authentic cockpit and, on the other hand, simulate the actual movements and accelerations acting on a real cockpit during the flight, during the take-off and the landing. This is achieved, for example, by arranging the cockpit on a movement platform such as a tripod, and the cockpit can be moved, tilted and accelerated in different directions by means of the movement platform.

SUMMARY OF THE INVENTION

It is an object of the present invention to provide device for carrying out movements by shifting the center of gravity and/or actuating muscles of a human body wherein a user generates a shift in the center of gravity by moving his waist region while the user is supported on the device and is able to incline a movable part of the device including the body of the user in different directions. In addition, it is conceivable for the user to wear video goggles during this and to be able to move in a virtual environment through the overall system of video goggles and said motion device, as well as to interact therewith. Herein, the movements caused by the user may be generated solely by the gravity by means of a shift in the center of gravity. In addition, it is also conceivable that the movements of the device are influenced by motors or dampers arranged on the device. It is also conceivable to provide an overall system of the device and an apparatus for visually outputting moving images, the user being at least partially enclosed by the output apparatus on the device. The output apparatus may be formed in a semicircular shape, the head of the user including the front part of the device being located within the output apparatus. By visually outputting, for example, a simulator application on the inside of the apparatus, a realistic impression of the user during a simulator application may be produced. Herein, the output apparatus should be dimensioned such that the user can move freely on the device without bumping into the output apparatus. Furthermore, three-dimensional images could be displayed by the output apparatus as well as on video goggles.

This object is achieved with a device as well as a system.

The free movability of the hip region of a user can ensure that the user can shift the center of gravity of the user or the overall center of gravity of the movable part of the device as well as the user's own body in such a way that this shift of the center of gravity results in a movement of the device due to gravity, whereby a particularly comfortable operating behaviour is achieved. This is because the device reacts very quickly to changes in the movement, and after a short adaptation period, a user is able to operate or move the device intuitively and in a measured manner.

A movement of users and moving parts of the device is possible about two virtual axes, a longitudinal axis and a lateral axis. These advantageously form an intersection point, which allows the user to initiate a movement about the longitudinal axis and a movement about the lateral axis with identical application of force.

Advantageously, the common center of gravity of the user's body and the moving parts of the device is located just below the intersection point of the longitudinal and lateral axes. As a result, the movable system is in a stable state. The fact that the center of gravity is arranged below the intersection point of the longitudinal and lateral axes means that the center of gravity is located below the intersection point of the axes in the vertical direction. Advantageously, it is possible for the user to position the center of gravity of the user's body by means of a movement of the waist region in such a way that a displacement of the movable parts of the device results therefrom or is caused thereby. In addition, the user feels as if he were hovering due to the free mobility of the user's waist region or the center of gravity of the user's body.

Advantageously, the device is divided into an upper and a lower part (up and down in the vertical direction), wherein the partitioning or contact plane may be located in the region of the base. In this plane, a planar surface of the upper and lower parts, respectively, abut against one another in a flange-like manner. The contact plane is intersected by a bolt which is inserted into both the upper and the lower parts of the device. The axial direction of the bolt does not coincide with the normal direction of the contact plane. Due to the kinematics resulting therefrom, the geometry of the upper contact surface is lifted from the geometry of the lower contact surface (and vice versa) when a twisting between the upper and lower device parts is triggered. A mutual lifting can be triggered by the fact that a circumferential edge of the one contact surface is at least partly pivoted into the other contact surface or forcedly pivoted into said other contact surface and is thereby forcedly moved upwards along the bolt. Furthermore, the axial direction of the bolt may be vertical. If a user of the device now performs a jerky motion, which results in a torque about the height axis of the device, this torque would result in a jerking or wobbling of the entire device in the case of a one-part device implementation. By means of a partition with the kinematics described, however, a torque about the height axis of the device results in a twisting between the upper and lower parts of the device, the upper and lower parts being lifted off during the twisting since the outer circumferential edge of the upper part is guided along the lower part (or vice versa) and performs, depending on the angular position of the bolt, a movement curve relative to the normal of the two contact planes more or less extensively. This will raise the center of gravity of the upper part of the device. By raising the center of gravity, the weight force of the upper part of the device causes a restoring moment whereby the device moves back into its initial position. As a result, jerky movements of a user on the device may be dampened or stabilized.

A damping element may advantageously be provided between the above-described contact surfaces of the upper and lower parts of the device, which is, for example, made of a rubber-like material which causes an additional damping effect. This damping element may be circular and may be inserted between the contact surfaces. Furthermore, it may have a through bore for receiving the bolt.

In an embodiment of the invention, all elements of the supporting means, that is, the shells for receiving the lower arms and lower legs, as well as the strut elements and handle elements, may be provided rigid relative to one another. By means of such an arrangement, a user is able to shift the user's center of gravity in a particularly simple and precise manner, as it is possible for a current application.

Advantageously, the supporting means for supporting the body parts includes two arm shells, each for supporting a forearm of the body, and two leg shells, each for supporting a lower leg of the body. By means of such an arrangement, it is possible for the user to freely move the user's waist region in order to be able to perform a shift of the center of gravity as simply as possible.

Advantageously, the supporting means for supporting the body parts also has two strut elements, each for supporting a sole of a foot. These struts are particularly suitable for securing the human body in the longitudinal direction thereof. Furthermore, the footrests facilitate mounting the device. Typically, prior to mounting, the device is positioned such that the foot struts themselves or an area around them get ground contact. This stabilizes the movable part of the device, which may be easily and securely mounted by a user.

Advantageously, the supporting means for supporting the body parts also has two handle elements, which can each be gripped by a hand of the user so that the user can simply secure or hold himself or herself in position. The user can lean into the device by means of the possibilities for support between the foot struts and the handle elements, thus shifting the center of gravity of the user's body in a particularly simple and defined manner.

Furthermore, in a preferred embodiment, the handle element may be formed as a unit with the corresponding arm shell. Corresponding means that the arm shell is closest to the handle element. Furthermore, each unit of arm shell and handle element may be provided such that it is displaceable independently of the other unit. Such a displacement may be made possible by the fact that the units of arm shell and handle element are guided on a rail system which is located between the movable part of the device and the unit of arm shell and handle element.

Advantageously, the device includes a detection device for detecting the current position of each movable part of the device, as well as a transmission device for transmitting the position data. Such an embodiment results in a wide variety of possible applications of the invention. By acquiring the position data, it is possible to transmit them to a computing unit, whereby applications for simulating virtual realities can be realized. For example, it is thereby possible to use the movements of the movable parts of the device for controlling functions in a computer game or a simulator application. For controlling an aircraft during a flight simulator application, it would be conceivable, for example, for a user of the device to rotate himself or herself and the moving parts of the device about a longitudinal axis, thereby also causing the aircraft in the flight simulator to rotate about its longitudinal axis. In order to also control the aircraft about its lateral axis, a user could also rotate himself or herself and the moving part of the device about a lateral axis, typically by shifting the center of gravity of the user's body. In order to operate the yaw rudder of the aircraft, that is, a rotation of the aircraft about the height axis, it would be conceivable that a user has to simultaneously move one unit of arm shell and handle element forward and the other unit backward.

Furthermore, it is conceivable for the device to have at least one motor and/or at least one damping element in order to be able to influence the movements of the device or of the person located thereon. For example, effects may be generated from a computer application, which result in a change in the position of the movable part of the device and thus also of the user located thereon. While operating a computer racing game, for example, a user could be tilted backwards during an acceleration operation, tilted forward during a braking operation, and tilted to the corresponding side as turns are passed. When a left turn is passed, a tilting of the device to the same side, namely also to the left, may be triggered in order to generate an effect which corresponds to "banking". However, it would also be conceivable to trigger a tilting of the movable part of the device to the right when a left turn is passed in order to simulate the effect of centrifugal force on the user. It would also be conceivable to make the handle elements movable and to detect the current position of the handle elements by a sensor and to transmit it to the computing unit. The handle elements could be formed such that they can be rotated like a twistgrip of a motorcycle. Such an embodiment could be applied if a motorcycle race is to be simulated. The possibility of movement of the units of arm shell and handle element on a rail system may also be detected in order to control acceleration or deceleration in a simulator application or another desired function.

Furthermore, it would be conceivable that the individual elements for supporting the extremities of the body, for example the forearms and the lower legs, are configured to be movable relative to one another. By means of corresponding mechanical kinematics of the possibilities of movement of these elements or by influencing the possibilities of movement by means of motors or damping elements, it would be possible, for example, to force a user to make certain movements or to allow only specific movements to the user. In this case, it would be conceivable to allow, during a swimming simulator application, a movement to a user which corresponds to the crawl stroke. Furthermore, it would be possible to make the movements of the user more difficult by means of electric motors or damping elements. As a result, a variety of further application possibilities of the device, such as, for example, the use as a sports simulator are obtained, wherein the user has to perform a physical activity during the simulator application which corresponds to or at least resembles the physical activity during the exercise of the corresponding sport. During a swimming simulator application, for example, the water resistance, which would also occur during actual swimming in the water and which counteracts a movement of the swimmer, may be simulated by means of motors or damping elements. The risk of drowning, to which a swimmer is permanently exposed in case of a faint or fatigue, may be significantly reduced by such a swimming simulator application. Nevertheless, the desired training effect takes place. Also, the risk of a crash for pilots may be avoided if they only practice aviation in the simulator, and no longer in open air space.

BRIEF DESCRIPTION OF THE DRAWINGS

An exemplary embodiment of the invention is discussed with reference to the accompanying drawings.

The drawings.

DETAILED DISCUSSION OF THE INVENTION

Figure 1:
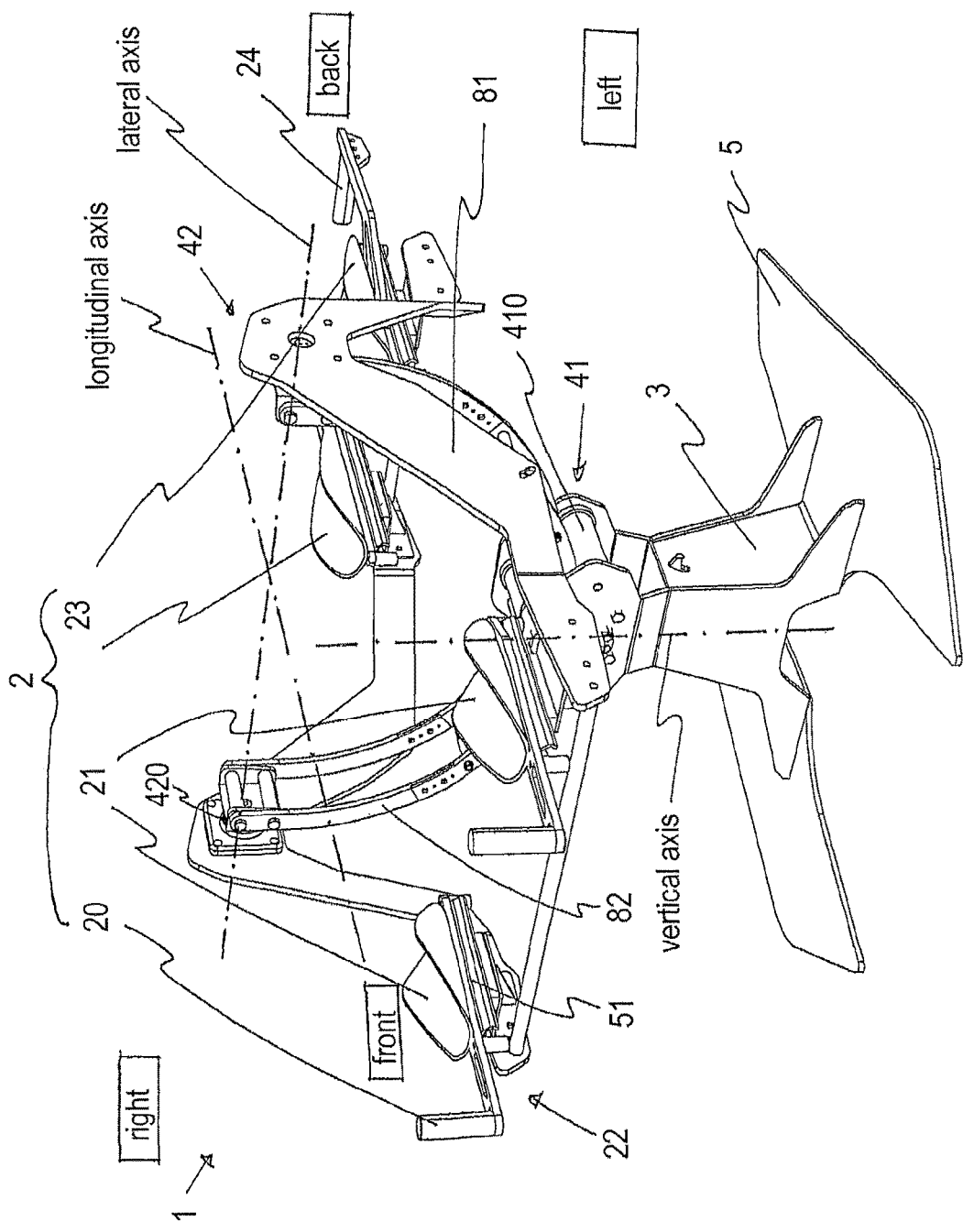
FIG. 1 shows an exemplary embodiment of the invention in a perspective view.

FIG. 1 shows a perspective view of the device 1 for carrying out movements by shifting the center of gravity and/or actuating muscles of a human body. A longitudinal axis is shown, which extends in a longitudinal direction of the device. A lateral axis is shown, which extends in a lateral direction of the device. And a height axis is shown, which extends in a vertical direction. The height axis may extend vertically, as shown in the present exemplary embodiment, or may also be inclined forwards or backwards. The directional and positional indications front, rear, left and right are also drawn in FIG. 1, and are additionally clearly shown in plan view in FIG. 4. The embodiment shown in FIG. 1 includes a base plate 5 and a base 3, via which the entire device 1 rests on the ground. The supporting means 2 has handle elements 20, arm shells 21 and leg shells 23. By means of the supporting means 2, the body of a user is supported on the device. The individual parts of the supporting means are connected to a frame element 81. The arm shell 21 on the right side of the device forms a unit with the handle element 20 on the right side of the device, and similarly the handle element 20 on the left side forms a unit with the arm shell 21 on the left side of the device 1. The handle element 20 and the arm shell 21, each forming a unit, are fixedly connected to each other in this embodiment. Each unit is connected to the frame element 81 by a rail element 51, whereby the respective units can move within fixed bounds in the longitudinal direction of the device 1. The individual elements of the supporting means 2 may be tilted together with the frame element 81 about the lateral axis of the device 1. This tilting functionality is made possible by an arrangement 420 of shaft and bearing, which connects the supporting structure (frame element 81) accommodating the supporting means 2 to an arcuate further supporting element (arcuate element 82). This further arcuate element 82 is supported by a roller support 41 and guided therethrough such that the supporting means 2, together with the frame element 81 and the arcuate element 82, can rotate about the longitudinal axis of the device. The roller guide 41 has an arcuate arrangement of roller elements 410 on which the components, that is, the supporting means 2, the frame element 81, and the arcuate element 82, are mounted, wherein, in addition, at least one roller is arranged in the vertical direction above the arcuate element 82 to also secure these components in a vertical direction. The components, that is, the supporting means 2, the frame element 81, and the arcuate element 82, are referred to as the movable part of the device. Furthermore, at the rear end of the supporting means 2, strut elements 24 are arranged, by means of which a user can support the soles of the feet. The height axis of the device 1 is arranged vertically in this embodiment. However, it would also be conceivable for the height axis to be inclined forwards or backwards. Further, in this embodiment, the longitudinal axis extends horizontally. It would also be conceivable for the longitudinal axis to be tilted downwards or upwards. In this exemplary embodiment, the lateral axis is fixed relative to the frame element 81. Thus, if the frame element 81 is tilted about the longitudinal axis, the lateral axis of the device also tilts. If the movable part of the device 1 has already been tilted about the longitudinal axis, a further tilting of the supporting means 2 together with the frame element 81 occurs therefore about the likewise tilted lateral axis.

The arcuate supporting element or arcuate element 82 does not necessarily have to be arcuate. In another embodiment, this supporting element may, for example, follow an arbitrary curve function with its shape. Furthermore, it would also be conceivable to configure the support element as a closed circle. In such an embodiment, it could be possible for the user to perform a full rotation about the longitudinal axis with the device.

Figure 2:
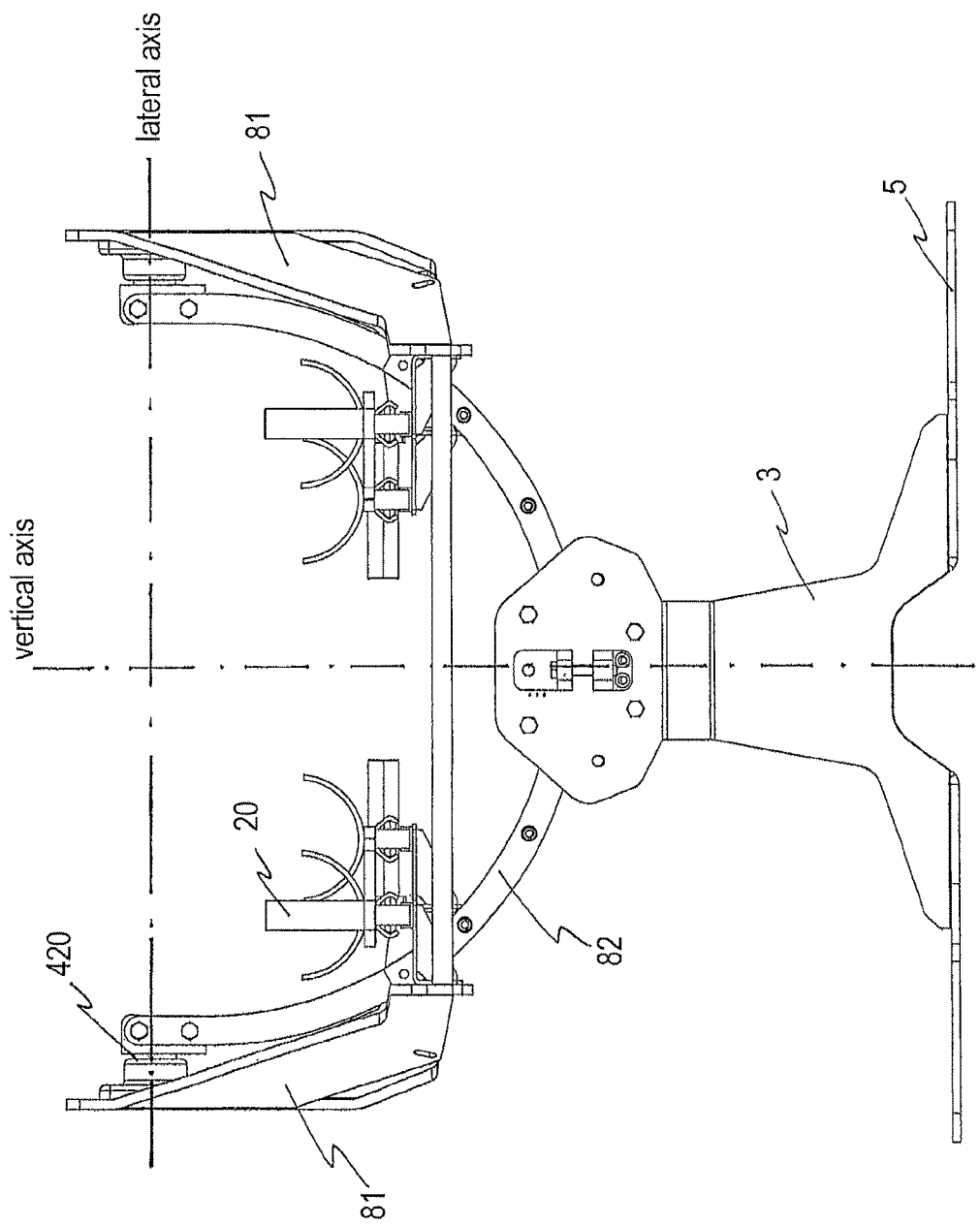
FIG. 2 shows an exemplary embodiment of the invention in a front view.

FIG. 2 shows the front view of a device 1 for carrying out movements by shifting the center of gravity and/or actuating muscles of a human body, the height axis of the device extending in the vertical direction and the lateral axis of the device extending in the horizontal direction. In this view, it can be seen clearly that the frame element 81 includes two parts arranged on the right and left sides of the image. The individual parts of the device 1 may be made of different materials, for example, carbon fibre reinforced plastics, conventional plastics or metal. In a preferred embodiment, the entire configuration of the device is as light as possible. By a small mass, in particular of the movable parts of the device, the operating convenience for the user may be increased since a tilting can be induced easier.

Figure 3:
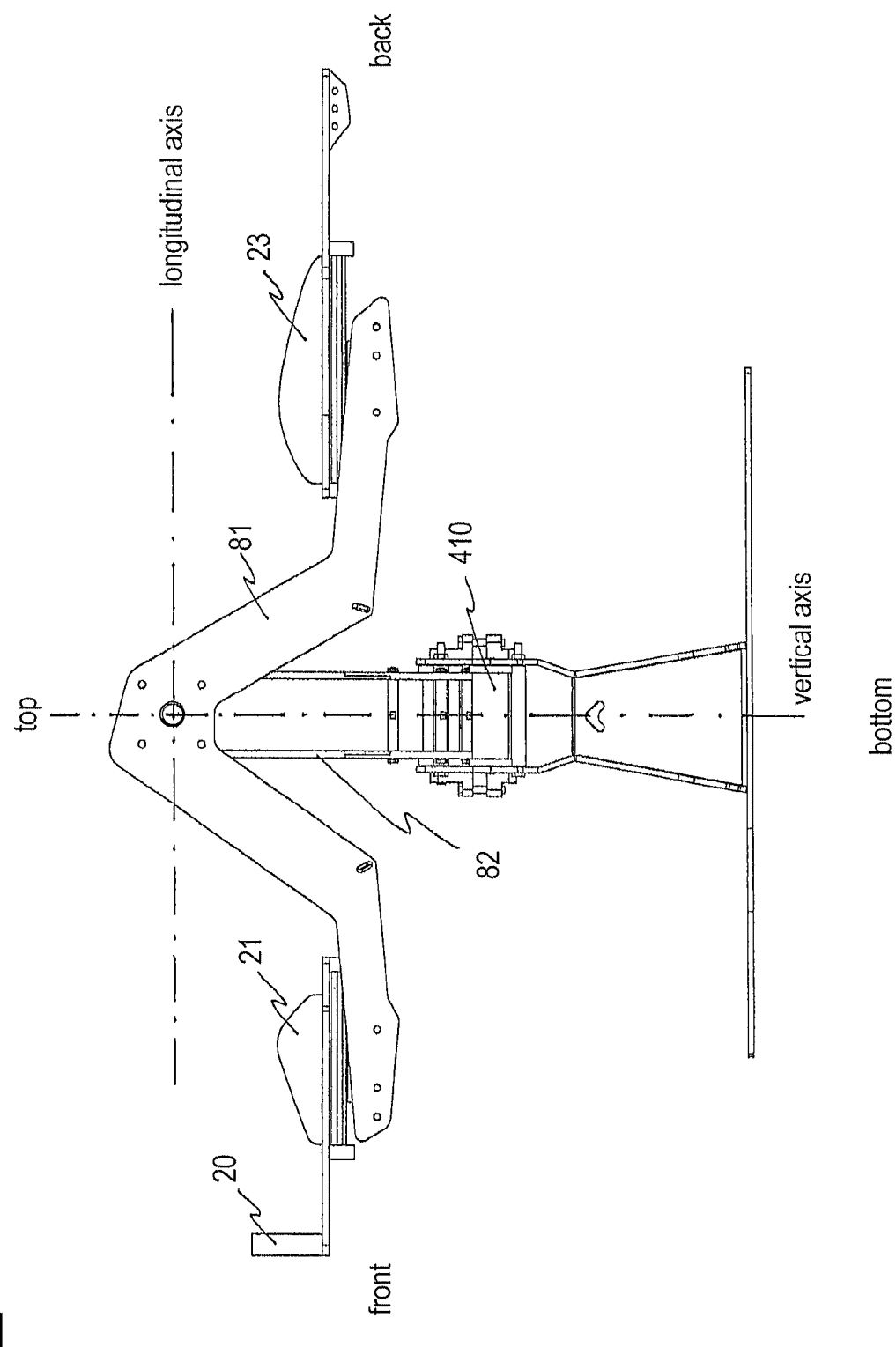
FIG. 3 shows an embodiment of the invention in a view from the left.

FIG. 3 shows a side view of an embodiment of the device 1 with the longitudinal axis of the device extending in the horizontal direction and the height axis extending in the vertical direction. When the frame element 81 tilts about the lateral axis of the device, the lateral axis extending in the direction of the drawing plane, that is to say out of the drawing plane, the supporting means 2, which comprises, among other elements, the arm shells 21, the handle elements 20 and the leg shells 23, tilts also about the lateral axis of the device.

Figure 4:
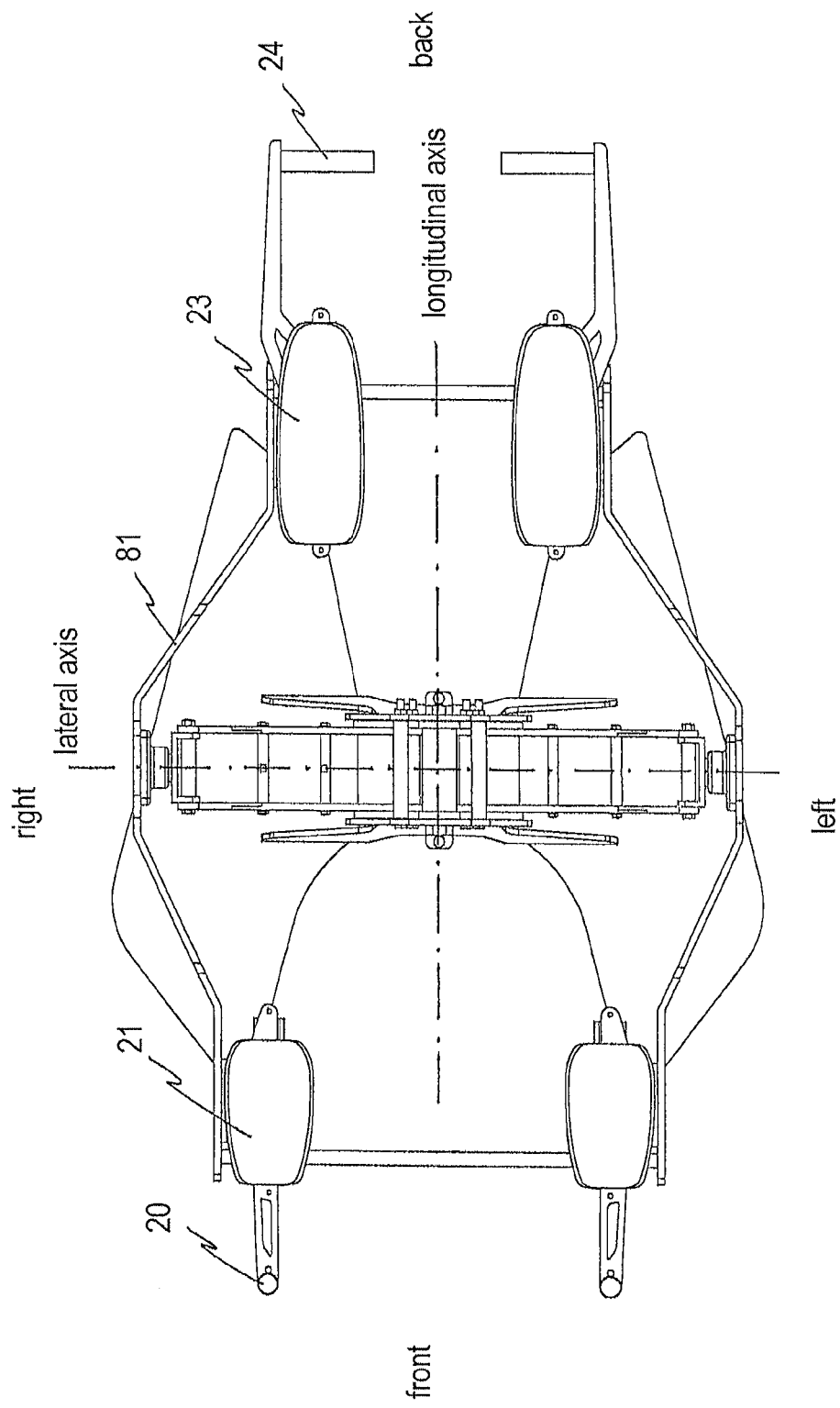
FIG. 4 shows an embodiment of the invention in plan view.

FIG. 4 shows a plan view of an embodiment of the device 1, the lateral axis of the device in the figure extending vertically and the longitudinal axis of the device extending horizontally, wherein the rear region of the device 1 is arranged on the right side of the image, the front region of the device 1 is arranged on the left side of the image, the right region of the device 1 is arranged at the upper edge of the image, and the left region of the device 1 is arranged at the lower edge of the image. Furthermore, the leg supports 23, the foot struts 24, the arm shells 21, and the handle elements 20 are recognizable.

What is claimed is:

1. An exercise device for carrying out movements by shifting a center of gravity a human body or actuating muscles of the human body, the exercise device comprising:
   a support for supporting a part of the human body, the support permitting a waist region of the human body to be freely movable;
   a base for supporting forces on a ground or on a wall;
   a kinematic device connecting the support to the base, the kinematic device for allowing a movement of the human body about a virtual longitudinal axis and about a virtual lateral axis of the kinematic device;
   wherein, the support comprises
      two arm shells, each arm shell for supporting a forearm of the human body, and
      two leg shells, each leg shell for supporting a lower leg of the human body.

2. The exercise device according to claim 1, wherein the support does not support the human body at the torso.

3. The exercise device according to claim 2, wherein the virtual longitudinal axis and the virtual lateral axis intersect at an intersection point.

4. The exercise device according to claim 3,
   wherein the kinematic device comprises a resting state in which by the center of gravity the human body is not shifted or the muscles of the human body are not actuated;
   wherein, in the resting state, the common center of gravity of the human body and the kinematic device is disposed at the intersection point or between the support and the intersection point.

5. The exercise device of claim 1,
   further comprising
      a contact plane defining a lower part and an upper part of the exercise device, and
      the base extending along an height axis, the height axis intersecting the contact plane, the height axis not being perpendicular to the contact plane;
   wherein the upper part is rotatable about the height axis relative to the lower part;
   wherein an overall center of gravity of the exercise device and the human body is raisable as a result of a relative rotation in order to generate a restoring moment.

6. The exercise device according to claim 5, further comprising a damping element between the upper part and the lower part.

7. The exercise device according to claim 1, wherein the support comprises a plurality of elements, the plurality of elements not being movable relative to each other.

8. The exercise device according to claim 1,
   wherein the support comprises two strut elements, each strut element for supporting a sole of a foot of the human body.

9. The exercise device according to claim 1, wherein the support comprises two handle elements, each handle elements for being gripped by a hand of the human body.

10. The exercise device according to claim 9,
    wherein the support comprises two arm shells, each arm shell for supporting a forearm of the human body,
    wherein each handle element is formed as a unit with the corresponding arm shell,
    wherein each unit is displaceable independently of the other unit.

11. The exercise device according to claim 1, further comprising
    a plurality of movable parts comprising the kinematic device and the support, the kinematic device being rotatable about the virtual longitudinal axis and the support being rotatable about the virtual lateral axis of the kinematic device;
    a position detector for detecting a current position of at least one movable part of the plurality of movable part, and
    a transmitter for transmitting data related to the current position to a computing unit for further processing.

12. The exercise device according to claim 1, further comprising
    a motor,
    a plurality of movable elements movable relative to the base, the plurality of movable elements comprising the kinematic device and the support,
    wherein a movement of the movable elements can be influenced,
    wherein the motor counteracts the movement of the movable elements or assists the movement of the movable elements.

13. The exercise device according to claim 1, wherein the supporter comprises a plurality of supporting elements, each supporting element movable relative to each other.

14. The exercise device according to claim 1,
    further comprising
       a plurality of movable parts movable relative to the base, the plurality of movable parts comprising the kinematic device and the support, and
       a plurality of stops for limiting a movement of movable parts,
    wherein degrees of freedom of the movement and the plurality of stops are adjustable at will.

15. The exercise device according to claim 1,
    wherein the kinematic device comprises a supporting element, the supporting element being a closed circle or a circular arc segment, the supporting element for rotating the human body about the longitudinal axis of the kinematic device.

16. A method for carrying out by a user movements by shifting a center of gravity of a human body of the user or actuating muscles of the human body in an exercise device, the exercise device comprising:
    a support for supporting a part of the human body, the support permitting a waist region of the human body to be freely movable;
    a base for supporting forces on a ground or on a wall;
    a kinematic device connecting the support to the base, the kinematic device for allowing a movement of the human body about a virtual longitudinal axis and about a virtual lateral axis of the kinematic device;
    two arm shells, each arm shell for supporting a forearm of the human body, and
    two leg shells, each leg shell for supporting a lower leg of the human body,
    the method comprising the steps of:
       moving, by the user, the supporter together with parts of the human body that is supported thereon about the lateral axis and the longitudinal axis by a shift of the center of gravity of the human body.

17. The method of claim 16,
the device further comprising
two handle elements, each handle elements for being gripped by a hand of the human body;
the method further comprising the step of
generating a control signal by moving, by the user, the arm shell and the handle element.

18. The method of claim 16,
the device further comprising
a contact plane defining a lower part and an upper part of the exercise device, and
the base extending along an height axis, the height axis intersecting the contact plane, the height axis not being perpendicular to the contact plane;
wherein the upper part is rotatable about the height axis relative to the lower part;
the method further comprising the steps of
applying a torque about the height axis to cause a rotation of the upper part relative to the lower part;
shifting, due to the rotation, the overall center of gravity upwards in a vertical direction;
generating a restoring moment by raising the overall center of gravity upwards; and
canceling, by the restoring moment, the rotation, shifting the overall center of gravity downwards in the vertical direction into the initial position, which is caused by gravity.

19. An exercise system comprising:
an exercise device for carrying out movements by shifting a center of gravity a human body or actuating muscles of the human body, the exercise device comprising
a support for supporting a part of the human body, the support permitting a waist region of the human body to be freely movable;
a base for supporting forces on a ground or on a wall;
a kinematic device connecting the support to the base, the kinematic device for allowing a movement of the human body about a virtual longitudinal axis and about a virtual lateral axis of the kinematic device; and
a visual output apparatus;
wherein the support comprises:
two arm shells, each arm shell for supporting a forearm of the human body, and
two leg shells, each leg shell for supporting a lower leg of the human body.

20. The exercise system according to claim 19; wherein the visual output apparatus comprises a set of video goggles worn on a head of the human body.

21. The exercise system according to claim 20,
further comprising
a plurality of movable parts comprising the kinematic device and the support, the kinematic device being rotatable about the virtual longitudinal axis and the support being rotatable about the virtual lateral axis of the kinematic device;
a position detector for detecting a current position of at least one movable part of the plurality of movable part, and
a transmitter for transmitting data related to the current position to a computing unit for further processing;
wherein a position of the head, a position of the set of video goggles when worn on the head, and a position of the at least one movable part of the plurality of movable parts are independently detected by the position detector and further processed by the computing device.

22. The exercise system according to claim 19,
wherein a user is at least partially surrounded by the visual output apparatus on the exercise device.

23. The exercise system according to claim 19,
wherein the visual output apparatus outputs still images or moving images.

24. The exercise system according to claim 19,
wherein the visual output apparatus outputs three-dimensional images.

25. The exercise device according to claim 1,
further comprising
a damping element, and
a plurality of movable elements movable relative to the base, the plurality of movable elements comprising the kinematic device and the support,
wherein a movement of the movable elements can be influenced,
wherein the damping element counteracts the movement of the movable elements.

* * * * *